United States Patent [19]
Haber et al.

[11] Patent Number: 5,373,561
[45] Date of Patent: Dec. 13, 1994

[54] METHOD OF EXTENDING THE VALIDITY OF A CRYPTOGRAPHIC CERTIFICATE

[75] Inventors: Stuart A. Haber, New York, N.Y.; Wakefield S. Stornetta, Jr., Morristown, N.J.

[73] Assignee: Bell Communications Research, Inc., Livingston, N.J.

[21] Appl. No.: 992,883

[22] Filed: Dec. 21, 1992

[51] Int. Cl.$^5$ .......................... H04L 9/00; H04L 9/30
[52] U.S. Cl. ........................................ 380/49; 380/23; 380/25; 380/30
[58] Field of Search ........................................ 380/3-5, 380/9, 10, 23, 24, 25, 28, 30, 49, 50

[56] References Cited

U.S. PATENT DOCUMENTS

| | | | |
|---|---|---|---|
| 4,405,829 | 9/1983 | Rivest et al. | 380/30 |
| 4,625,076 | 11/1986 | Okamoto et al. | 380/30 X |
| 4,868,877 | 9/1989 | Fischer | 380/25 |
| 4,881,264 | 11/1989 | Merkle | 380/25 |
| 4,972,474 | 11/1990 | Sabin | 380/28 |
| 5,001,752 | 3/1991 | Fischer | 380/23 |
| 5,136,646 | 8/1992 | Haber et al. | 380/49 |
| 5,136,647 | 8/1992 | Haber et al. | 380/49 |

OTHER PUBLICATIONS

*Cryptography and Data Security*, D. E. R. Denning, pp. 170–171, Addison–Wesley Publishing Company (1982).

Primary Examiner—Bernarr E. Gregory
Attorney, Agent, or Firm—Leonard Charles Suchyta; Lionel N. White

[57] ABSTRACT

A cryptographic certificate attesting to the authenticity of original document elements, such as time of creation, content, or source, will lose its value when the cryptographic function underlying the certifying scheme is compromised. The present invention provides a means for extending the reliability of such a certificate by subjecting, prior to any such compromise, a combination of the original certificate and the document digital representation from which that certificate was derived to a scheme based on a different and ostensibly less vulnerable function. The new certificate resulting from this procedure extends the validity of the original authenticity by implacably incorporating the original certificate at a time when that certificate could only have been derived by legitimate means.

20 Claims, 2 Drawing Sheets

METHOD OF EXTENDING THE VALIDITY OF A CRYPTOGRAPHIC CERTIFICATE

BACKGROUND OF THE INVENTION

This invention relates to methods for certifying or validating the existence or occurrence of a recorded document or event, particularly methods which rely upon cryptographic assumptions to establish the basis for such a certification or validation. More specifically, the invention relates to a method for reconfirming an original certificate in order to maintain its validity for a significant period of time beyond the probable compromise of an underlying cryptographic assumption or step in the original certification procedure.

Time-stamping procedures described in U.S. Pat. Nos. 5,136,646 and 5,136,647 are representative of a type of certification for which the present method is adapted. Such schemes for setting a reliable time of creation of a document, or providing indisputable evidence against the alteration of a document, generally digital computer data in alphanumeric, pictorial, video, or audio form, depend upon the assumption that there exist cryptographic functions which, when applied to a digital representation of such a document, defy any manner of manipulation which might permit undetectable alterations or falsifications of the original state of document elements. The functional procedures generally exemplified in those disclosures typically provide this required property, since they generate unique certificate statements which essentially can not be duplicated other than from an identical document representation. This security arises from the fact that the derivation or reconstruction of these functions from the products of their application is computationally infeasible. Ultimate achievement of such derivations must be anticipated, however, since a given function or procedure may be fatally flawed or, as is becoming more probable, advancements in computer technology and algorithmic techniques are likely to make more readily available a level of calculating power which enables such derivation.

With compromise of a step or algorithm in a procedural certification function, the possibility arises of generating duplicate certificates or parts thereof from different digital representations, i.e., creating "collisions", and thereby defeating the previously reliable basis for a certification scheme. Substitution of a newer and presumably less vulnerable function in the certification procedure may prevent for some finite time the compromise of future certificates, but the value of past certificates in establishing original creation dates, for example, is all but lost. The present invention, however, provides a means for bridging the technological gap and extending into the era of a newer function or procedure the validity of the original certification.

SUMMARY OF THE INVENTION

Historically, there has usually been an overlap period between the time spans of reliability of an established cryptographic function and one which has been newly implemented with improved resistance to compromise. As computational power increases and algorithmic techniques improve, the evolution and phasing of cryptographic certification procedures or functions, for example, can generally be foreseen, It is possible, therefore, to anticipate the final stages of reliability provided by an existing certification scheme and to initiate a procedure, such as provided by the present invention, to ensure the continuity of original certificate validity.

In essence, this invention entails generating from the original document a new document certificate during the viable term of the original certification scheme, such as may be based upon a cryptographic signature key procedure or a time-stamping procedure. This new certification process comprises applying a different cryptographic function, e.g., a time-stamping procedure, to a combination including the original certificate and the original digital document from which the certificate was derived. Such a different function is preferably a new and presumably more reliable algorithm or procedure, or at least one upon which the original certification did not rely. The resulting certificate, generated by means of a function or procedure having a significant expected remaining term of reliability, now implacably embodies the original certificate elements at a time prior to any likely compromise of the original certification function. Since these original elements have as yet been exposed to no threat of compromise and are now bound by the new time stamp within the protective cloak of a far more relatively invulnerable certification function, their original veracity has been extended for at least the reliable term of this new function.

BRIEF DESCRIPTION OF THE DRAWING

The present invention will be described with reference to the accompanying drawing of which.

DESCRIPTION OF THE INVENTION

The extension procedure of the present invention is applicable to any manner of certificate digitally derived by cryptographic means, For instance, the process may be used to support the veracity of a document transmittal originally certified with a cryptographic key signature algorithm or function beyond a time when that function might be compromised, whether due to misappropriation of a secret key or to advances in computer technology and algorithmic techniques. A digital time-stamp certificate could similarly benefit by application of the invention to prevent its coming into question after compromise of the scheme or function underlying the time-stamping procedure. In general, the process of the invention is useful to ensure the continued viability of any certificate produced by a digital scheme or function which is capable of compromise.

Figure 1:
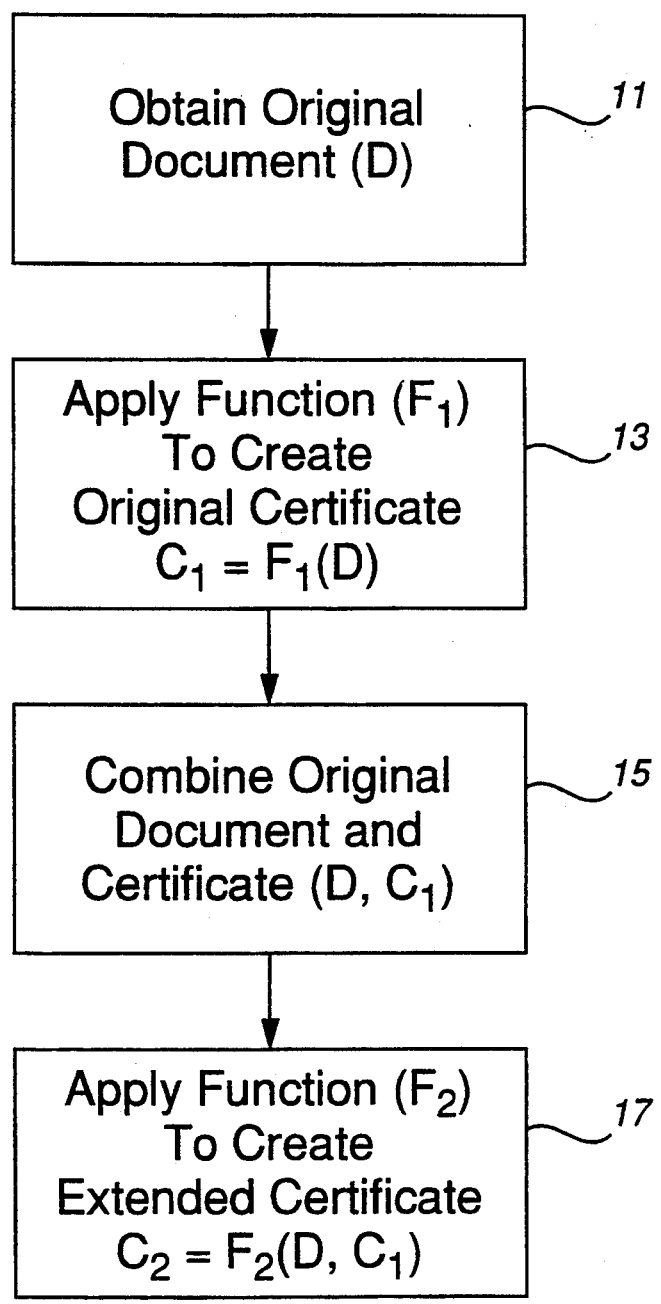
FIG. 1 presents a flow chart of steps embodying a general procedure implementing the certificate extension process of the invention.

The steps comprising a basic application of the certificate extension process are shown in FIG. 1. There, initial steps 11, 13 are intended to depict any certification procedure, such as a signature scheme or time-stamping process, in which a digital document, $D_1$, e.g., a body of text or alphanumeric representations, a picture, an audio recording, or the like, is subjected to a cryptographic scheme or procedure, generally a "function", $F_1$, to produce a certificate, $C_1$, which will serve later as evidence of the original existence and substance of $D_1$. The value of certificate, $C_1$, will persist, however, only until a compromise of the certification function, as a whole or in a component step or algorithm, since, as a result of such a compromise, the certificate might thereafter be duplicated by an imposter or through the use of a counterfeit document.

The basic steps of the invention are therefore effected prior to any such compromise, as projected, for example, on the basis of the current state of computational technology, and comprise combining, at 15, the original document, D, with the original certificate, $C_1$, and applying to that combination, at 17, a different and presumably more secure scheme or function to obtain a new certificate, $C_2$, which will later attest to the validity of original certificate, $C_1$, at a time when its generating function, $F_1$, was as yet uncompromised and secure. The essential element of this process resides in the application of the new certification function to the conjunction of original document, D, with original certificate, $C_1$. This step avoids the error inherent in the naive and ineffectual procedure of merely recertifying either the original certificate or the original document alone; namely, that of perpetuating a compromise which reflects directly upon the veracity of the original document, D.

As an example, one might consider application of the present invention to extend the valid lifetime of a digitally signed document where, in keeping with usual practices, a digital signature, $\sigma$, is derived by application of some cryptographic signature scheme to a document, D. To avoid invalidation of such a signed document by subsequent compromise of the scheme, for instance, due to misappropriation of a user's private key, the pre-compromise generation of a certificate, C, by application of a time-stamp function, T, to a combination of the signature and the document:

$$C=T(\sigma,D)$$

will provide continuing proof that the signature was created prior to the compromise, i.e., at a time when only a legitimate user could have produced it. Such a certificate might also be used to establish original authorship of the document.

The invention is broadly useful, as well, as a means of extending or "renewing" time-stamp certificates, generally. For example, a simple scheme for certifying an event, such as time-stamping the creation of a document, comprises establishing a digital representation of the document content, adding data denoting current time, and permanently fixing the resulting digital statement against subsequent revision, all under trustworthy circumstances, to yield a certificate which will provide irrefutable evidence of the event at a later time. Means for ensuring the original veracity of the certificate have been described in our earlier-noted patent specifications as including use of trusted outside agencies, arbitrary selection of agencies, linking of certificates in temporal chains, and similar practices which remove substantially all influence a document author might have upon the certification process. Other methods of establishing the authenticity of original certification procedures might also include private and public key cryptographic communications.

Common to certification procedures is the application of some manner of cryptographic function by which the document, related identifying data, or digital representations of these elements may be algorithmically reduced to a unique statement or cipher which can not feasibly be duplicated from different representative elements by computational means. Any of the general class of one-way hashing algorithms, for example, may be used in such a procedure or function applied to a digital representation of a time-receipted document to produce an inimitable certificate, usually in the form of a cryptic string of alphanumeric characters, which can only be generated by such an application of that same function to exactly that digital representation. The additional characteristic property of the one-way function is that of possessing such mathematical complexity as to discourage the computational derivation or reconstruction of the original digital representation from the resultant certificate, as well as to discourage the generation of a matching certificate from a different representation.

Figure 2:
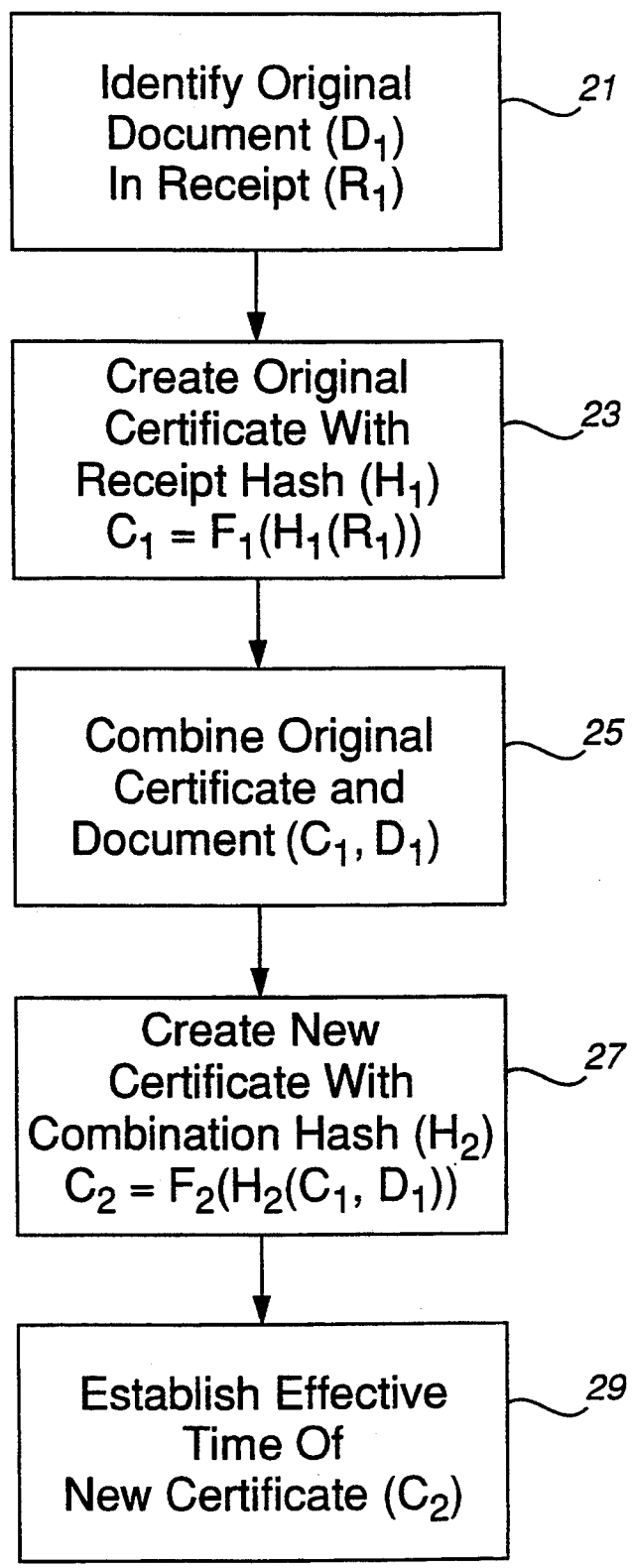
FIG. 2 presents a flow chart of steps embodying a rudimentary time-stamping procedure implementing the certificate extension process of the invention.

A simple certification procedure utilizing such a one-way hashing algorithm is represented in FIG. 2 at steps 21-23. There, digital document, $D_1$, of step 21 is identified, e.g., annotated with author data, to yield a receipt, $R_1$, that, in a rudimentary procedure which may be simply stated as:

$$C_1=F_1(H_1(R_1))$$

is in turn reduced at step 23 to a certificate, $C_1$, by application of a time-stamping function, $F_1$, comprising a current hash algorithm, $H_1$.

As a result of computational or algorithmic developments over time, or in the event of a flaw in the function itself, hash, $H_1$, may become compromised with the result that a falsified receipt, $R_x$, could produce a duplicate, or "collision", certificate, $C_1$. The veracity of original certificate, $C_1$, and its value as probative evidence of the contents of document, D, and other elements of receipt, $R_1$, would thus be destroyed, since there would no longer exist a singular certificate cipher that could be traced solely to the original document and its once-unique receipt, $R_1$.

Advent of the collision need not denigrate the worth of the initial certificate back to the time of its creation, however, but only for the period subsequent to the compromise. The value of the certificate during its earlier term could be preserved and extended into the future if means were available to link into a time prior to such compromise with a trustworthy scheme for deriving a new certificate at least as unique and intractable as was the initial certificate. The problem, therefore, has been to "recertify" the original certificate in a manner which would verify the facts that had been securely bound into that certificate until the first collision occurred.

A naive solution to this problem would appear to be just that simple; that is, to recertify the original certificate, for example by applying a new and more robust hash, $H_2$. The fallacy in this approach becomes apparent, however, when one considers that after the instance of a collision the condition exists where:

$$H_1(R_1)=C_1=H_1(R_x).$$

The hashing of certificate, $C_1$, with a new function, $H_2$, would therefore not produce a renewal certificate cipher, $C_2$, unique only to receipt, $R_1$, since:

$$C_2=H_2(C_1)=H_2(H_1(R_1))=H_2(H_1(R_x))$$

and, thus, there is no reliable distinction between those resulting certificates.

The present invention, however, does provide such a unique certificate which serves to extend the veracity of an original certificate beyond subsequent compromise of the original function or algorithm. This is accomplished, as in the representative of FIG. 2, by combining, at step 25, the original certificate, $C_1$, with the original document, $D_1$, from which it was generated and which is to be later proven, and applying to that composite statement, at step 27, a different certification function, $F_2$, e.g., comprising a new hashing algorithm, $H_2$, to yield the extended certificate:

$$C_2 = F_2(H_2(C_1, D_1)) = F_2(H_2(H_1(R_1), D_1)).$$

The final represented step, 29, in which it is established that the new certificate, $C_2$, was created during the valid term of original certificate, $C_1$, i.e., prior to any compromise of the original certification function, may be effected along with step 27, for example in the course of applying an earlier-described time-stamping procedures, to generate certificate, $C_2$. Alternatively, the effective time of the new certificate, $C_2$, may be established simply by publication, e.g., in a widely-distributed newspaper, either alone or as incorporated into a derivative representation similar to the "authentication tree" noted by D. E. R. Denning in *Cryptography and Data Security*, pp. 170–171, Addison-Wesley (1982).

In the ultimate utilization of this new certificate, $C_2$, to prove the original document, $D_1$, by recomputing certificate, $C_2$, from its elements, such proof will fail unless original document, $D_1$, rather than a bogus document, $D_x$, is an included element. Even though a collision due to compromised function, $H_1$, may exist at the time of using certificate, $C_2$, in a proof, the as yet invulnerable state of hash function, $H_2$, ensures against any collision with the expanded statement, i.e., one comprising document element, $D_1$, which is used to generate that new certificate. During a normal proofing process, the original certificate, $C_1$, will also be recomputed using the document in question. Unless the document then employed to recompute original certificate, $C_1$, matches precisely the document similarly employed with new certificate, $C_2$, the proof will not be realized. A false document, $D_x$, therefore can not be substituted surreptitiously for an original document as long as the applied hash function, $H_2$, remains uncompromised, since for any document, $D_x$, which one could feasibly compute:

$$H_2(C_1, D_1) \neq H_2(C_1, D_x).$$

When advancements in computation portend a compromise situation, yet a different time-stamp function, e.g., one utilizing algorithm, $H_3$, with longer life expectancy may be employed in the same procedure to again extend the involved certificate.

As an example of the implementation of the present invention, one might consider first an initial certificate prepared in the manner described in our earlier U.S. Pat. No. 5,136,646 employing the one-way hash algorithm specified by R. L. Rivest in "The MD4 Message Digest Algorithm", Advances in Cryptology—Crypro '90, Lecture Notes in Computer Science, Vol. 537 (ed. A. J. Menezes et al.), pp. 303–311, Springer-Verlag (Berlin, 1991). In that earlier example, elements of the receipt, $R_1$, identifying the quotation "document" appeared as:

1328, 194628GMT06MAR91, 634, ee2ef3ea60ef10cb621c4fb3f8dc34c7 and with additional data representing a prior transaction formed the basic statement to which the function comprising MD4 hash algorithm, $H_1$, was applied to yield the unique cipher:

46f7d75f0fbea95e96fc38472aa28ca1 which is held by the author as a time-stamp certificate, $C_1$.

In the event of an anticipated compromise of the MD4 hash function algorithm, the procedure of this invention would be initiated utilizing a different time-stamping certification function comprising, for example, a new algorithm, $H_2$, such as the MD5 hashing function described by Rivest and Dusse, "The MD5 Message Digest Algorithm", Network Working Group, Internet Draft, RSA Data Security, Inc. (July 1991); RFC 1321, Internet Activities Board (April 1992).

As an initial step in this procedure, the document representation, $D_1$, to be proven at a later time is combined with original certificate, $C_1$, either in original digital form or, preferably, as the convenient, condensed output of hash function, $H_2$, viz.:

.D9776652kDAj2.M5191CAD7 thus forming the combination statement, $(C_1, D_1)$, as:

46f7d75f0fbea95e96fc38472aa28ca1,

.D9776652kDAj2.M5191CAD7.

Applying to this statement hashing algorithm, $H_2$, comprising the new function, $F_2$, produces:

656h//PDDM60M9/qDDt85F56 which in a time-stamping procedure, for instance, may be transmitted to an outside agency for the inclusion of current time data and authenticating cryptographic signature to yield extended certificate, $C_2$. As earlier noted, the effective date of a new certificate, $C_2$, may otherwise be established, such as in other time-stamping schemes or by public display or notoriety.

A variation on the foregoing embodiment provides an even more reliable practice in that it substantially eliminates the uncertainties associated with estimating the onset of a certification function compromise. This is accomplished by using a plurality of different cryptographic functions, e.g., $F_a$ and $F_b$, to derive a compound original certificate, $C_\alpha$:

$$C_\alpha = F_a(D_1), F_b(D_1).$$

which will remain valid even after the confirmed compromise of one of those function due to the likely continued viability of the other. Thus a period of security continues during which one may select a new certification function, $F_c$, to be employed in the extension of certificate, $C_\alpha$ as:

$$C_\beta = F_b(C_\alpha, D_1), F_c(C_\alpha, D_1).$$

Subsequent compromise of any current cryptographic function can be remedied in like manner.

It is anticipated that other variants will become apparent to the skilled artisan in the light of the foregoing disclosure, and such embodiments are likewise considered to be encompassed within the scope of the invention defined by the appended claims.

What is claimed is:

1. A method of extending the validity of a first cryptographic certificate derived by applying a first cryptographic function to a digital document, which method comprises:
   a) combining a digital representation of said document with a digital representation of said certificate; and
   b) applying to the resulting combination during the valid term of said first certificate a different cryptographic function to thereby generate a second certificate attesting to the then current validity of said first certificate.

2. A method according to claim 1 wherein said first function is a cryptographic signature scheme.

3. A method according to claim 2 wherein said different function is a time-stamping procedure.

4. A method according to claim 3 wherein said different function comprises a one-way hashing algorithm.

5. A method according to claim 1 wherein said first function is a time-stamping procedure.

6. A method according to claim 5 wherein said first function comprises a one-way hashing algorithm.

7. A method according to claim 5 wherein said different function is a time-stamping procedure.

8. A method according to claim 7 wherein said first function comprises a first one-way hashing algorithm and said different function comprises a different one-way hashing algorithm.

9. A method according to claim 1 wherein said different function is a time-stamping procedure.

10. A method of certifying a digital representation of a document which comprises:
    a) generating a first certificate by applying to said digital representation at least a first cryptographic function;
    b) combining said first certificate with said digital representation; and
    c) generating a second certificate by applying to said combination at least one cryptographic function which is different from said first function.

11. A method according to claim 10 wherein said first function is a cryptographic signature scheme.

12. A method according to claim 11 wherein said different function is a time-stamping procedure.

13. A method according to claim 12 wherein said different function comprises a one-way hashing algorithm.

14. A method according to claim 10 wherein said first function is a time-stamping procedure.

15. A method according to claim 14 wherein said first function comprises a one-way hashing algorithm.

16. A method according to claim 14 wherein said different function is a time-stamping procedure.

17. A method according to claim 16 wherein said first function comprises a first one-way hashing algorithm and said different function comprises a different one-way hashing algorithm.

18. A method according to claim 10 wherein:
    a) said first certificate is generated by applying to said digital representation at least first and second different cryptographic functions; and
    b) said second certificate is generated by applying to said combination at least one cryptographic function which is different from said first and second functions.

19. A certificate authenticating a digital representation of a document, said certificate consisting of a second certificate generated according to the method of claim 10.

20. A certificate according to claim 19 wherein:
    a) said first certificate is generated by applying to said digital representation at least first and second different cryptographic functions; and
    b) said second certificate is generated by applying to said combination at least one cryptographic function which is different from said first and second functions.

* * * * *